US008959148B2

(12) United States Patent
Kothari et al.

(10) Patent No.: US 8,959,148 B2

(45) Date of Patent: Feb. 17, 2015

(54) SYSTEMS AND METHODS FOR AUTOMATED LABELING OF SOCIAL CONNECTIONS

(75) Inventors: Pankaj Kothari, Bangalore (IN); Saurabh Sahni, Indore (IN)

(73) Assignee: Yahoo! Inc., Sunnyvale, CA (US)

( * ) Notice: Subject to any disclaimer, the term of this patent is extended or adjusted under 35 U.S.C. 154(b) by 339 days.

(21) Appl. No.: 13/274,954

(22) Filed: Oct. 17, 2011

(65) Prior Publication Data

US 2013/0097237 A1 Apr. 18, 2013

(51) Int. Cl.

*G06F 15/16* (2006.01)
*G06Q 50/00* (2012.01)

(52) U.S. Cl.

CPC .................................... *G06Q 50/01* (2013.01)
USPC .......................................................... 709/204

(58) Field of Classification Search

CPC ....... H04L 67/22; H04L 67/10; H04L 67/306; G06Q 50/01
USPC .......................... 709/201, 203, 217, 219, 204
See application file for complete search history.

(56) References Cited

U.S. PATENT DOCUMENTS

| | | | | |
|---|---|---|---|---|
| 2010/0146054 | A1* | 6/2010 | Armstrong et al. | 709/205 |
| 2010/0268661 | A1* | 10/2010 | Levy et al. | 705/347 |
| 2011/0167114 | A1* | 7/2011 | Blanchard et al. | 709/204 |
| 2011/0196923 | A1* | 8/2011 | Marcucci et al. | 709/204 |

* cited by examiner

*Primary Examiner* — Vivek Srivastava
*Assistant Examiner* — Normin Abedin
(74) *Attorney, Agent, or Firm* — James J. DeCarlo; Greenberg Traurig, LLP

(57) ABSTRACT

First data relating to a first user and second data relating to a second user are retrieved from a plurality of sources. A social connection is identified, by a computing device, between the first user and the second user using the first data and the second data. A label that describes the social connection is identified, by the computing device, using the first data and the second data. A first profile relating to the first user and a second profile relating to the second user is updated by the computing device to reflect the social connection and the label for the social connection.

20 Claims, 6 Drawing Sheets

SYSTEMS AND METHODS FOR AUTOMATED LABELING OF SOCIAL CONNECTIONS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE DISCLOSURE

The present disclosure relates to systems and methods for labeling social connections on socially enabled websites, and more particularly, to labeling social connections on socially enabled websites using data from a plurality of different socially enabled websites.

BACKGROUND

Users often manage a large list of friends on various social networks on multiple social networking websites such as, for example, the Y!PULSE, FACEBOOK, TWITTER, and LINKEDIN websites. Using data derived from such websites, social connections can be automatically labeled using data that indicates the nature and purpose of such social connections.

SUMMARY

In an embodiment, the disclosure is directed to a method. First data relating to a first user and second data relating to a second user are retrieved from a plurality of sources. A label that describes a social connection between the first user and the second is identified, by the computing device, using the first data and the second data. A first profile relating to the first user and a second profile relating to the second user is updated by the computing device to reflect the social connection and the label for the social connection.

In another embodiment, the disclosure is directed to a method, system and computer-readable storage media for tangibly storing thereon computer-readable instructions for a method. User data relating to a plurality of users is retrieved, over a network. The user data is retrieved from a plurality of websites and comprises social graph data, profile data, interest data and interaction data relating to each user of the plurality of users. A plurality of social connections are identified by a computing device using the social graph data. Each social connection of the plurality of social connections reflects a connection between a respective first user and a respective second user of the plurality of users. Each social connection of the plurality of social connections is labeled by the computing device with a respective first set of labels. Each respective label of the respective first set of labels is based on respective profile data and respective interest data for the respective first user the respective second user of the plurality of users associated with the respective social connection, such that the respective label represents respective interest data or profile data for the respective first user that matches respective interest or profile data for the respective second user. Data can be retrieved from a variety of sources, enabling the labeling of connections in multiple rich ways.

The plurality of social connections are clustered by the computing device into a plurality of clusters of social connections. Each cluster of social connections comprises a respective subset of the plurality of social connections having mutual connections. Each social connection of the plurality of social connections is labeled by the computing device with a respective second set of labels. Each respective label of the respective second set of labels is based on a respective cluster of social connections of the plurality of clusters of social connections that the respective social connection is associated with.

Each social connection of the plurality of social connections is labeled by the computing device with a respective third set of labels. Each respective label of the respective third set of labels is based on respective interaction data reflecting communications between the respective first user of the plurality of users and the respective second user of the plurality of users associated with the respective social connection. Each social connection of the plurality of social connections is analyzed by the computing device to determine a respective strength of the respective social connection, where the respective strength of the connection is based on respective profile data, respective interest data, respective interaction data and mutual connections for the respective first user and the respective second user of the plurality of users associated with the respective social connection.

BRIEF DESCRIPTION OF THE DRAWINGS

The foregoing and other objects, features, and advantages of the disclosed systems and methods will be apparent from the following more particular description of preferred embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
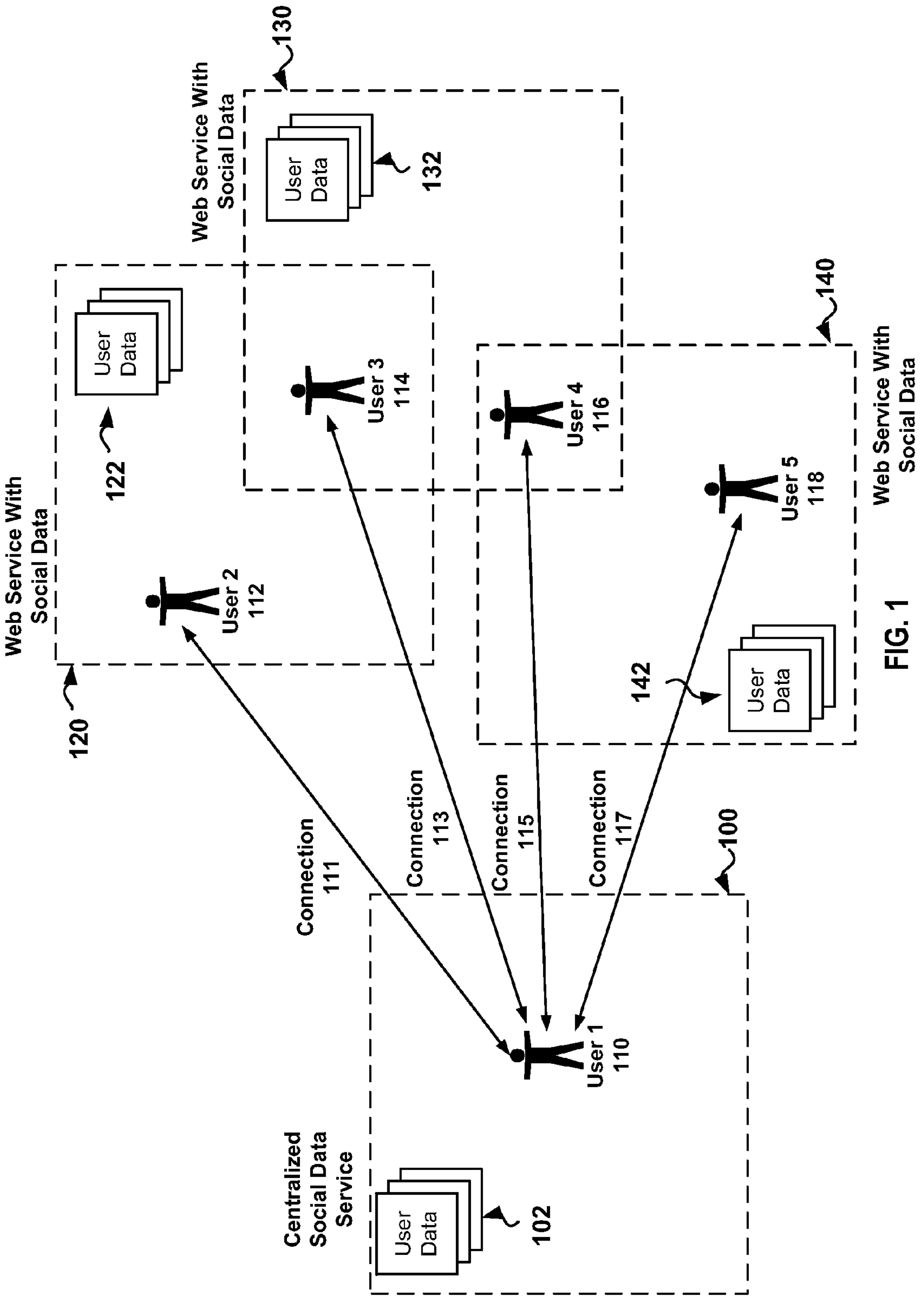
FIG. 1 provides a high-level conceptual overview of one embodiment of systems and methods for automated labeling of social connections.

The systems and methods described below with reference to block diagrams and operational illustrations of methods and devices to automatically label social connections. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Reference in this specification to "an embodiment" or "an embodiment" or "some embodiments" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments, but not other embodiments.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, a computer-readable medium stores computer data, which data can include computer program code that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM (random access memory), ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "social data" should be understood to refer to any type of data the indicates a relationship between two users. Such data could include user-defined connections such as user-defined relationships between two users on a social networking website such as the TWITTER (e.g. follows) or FACEBOOK (e.g. friend). Such data could reflect implicit relationships such as, for example, employees of the same employer as reflected on a corporate website or users having similar interests as reflected on their respective profiles. Such data could also be reflected in communications between two users such as, for example, emails and instant messages.

In various embodiments, the presently disclosed systems and methods provide for automated labeling of social connections based on data from multiple social networks and other sources of social data. FIG. 1 provides a high-level conceptual overview of one embodiment of such systems and methods as defined herein. User 1 110 is a member of a centralized social data service and three web services with social data 120, 130 and 140. The web services with social data 120, 130 and 140 could be any type of web service having social data reflecting or implying relationships between users such as, for example, without limitation, social networking websites, messaging services and/or organizational websites.

User 1 110 has social connections 111, 113, 115 and 117 to users 112, 114, 116 and 118. The term "social connection" be understood to refer to any type of relationship that can exist between two users such as, for example, friends, relatives, co-workers, or having a specific interest. Such connections may or may not be reflected in social data on a web service. In the illustrated example, however, data relating to the social connections 111, 113, 115 and 117 is available on three web services. Expressly labeled connections, such as "friends" on a social networking website can provide some information relating to the connection, but may not fully reflect the nature of the relationship, for example, "friends" may be "golf buddies".

As shown in FIG. 1, data relating to a specific connection may be available on more that one web service, as in the example of connections 113 and 115, where data relating to the connections is on web services 120, 130 and 140. This diversity of sources could reflect, for example, two social networking websites and a messaging service. In one embodiment, the centralized social data service 100 gathers all user data 122, 132 and 142 relating to user 1 110 from web services 120, 130 and 140.

Such user data could include explicit connections between two users on a socially enabled website and/or mutual connections (e.g. either "friends" or "relatives" of the same user). Such data could include communications of any type (e.g. email, instant messages, status messages and/or "TWEETS") between users or posted to for viewing by the general public. Such data could include data relating to behavior (e.g. specific activities such as golfing), activities (concerts or sporting events), and location (e.g. same city or neighborhood based on real-time location). Such data could include profile information, including demographics of any type, work address, home address, employer and interests.

This data is then analyzed to identify data relating to connections between users. In one embodiment, a user, for example, user 1 110, explicitly defines connections with other users, such as the connections 111, 113, 115 and 117 in the illustrated embodiment, to the centralized social data service. In such case, the data relating to connections between users can be used to label the connections 111, 113, 115 and 117 with one or more labels. Such labels could include any type of short descriptive label relating to the connection, for example:

- Family
  - Second cousins
  - Spouse
- Friend
  - Local buddy
  - Schoolmates
- Co-worker
  - Colleagues
- Neighbor
  - Topic
  - Wildlife enthusiasts
- Event
  - Attending Bangalore bar camp event Additionally or alternatively, in one embodiment, users do not explicitly define connections with other users to the centralized social data service. In such case, the centralized social data service automatically creates connections between users using user data from one or more web services and labels such connections as described above. In one embodiment, connections are only created between users who are members of the centralized social data service. In one embodiment, connections are created between users of the centralized social data service and external users by, for example, creating profiles for such external users (which in some embodiments, could be later claimed by the external users).

In one embodiment, data relating to connections and connection labels, can be stored as user data 102 on the centralized social data service for all of the users 110, 112, 114, 116 and 118. In one embodiment, the centralized social data service 100 serves as a standalone data repository service, where connections are stored and labeled and are visible to users of the service. In one embodiment, the centralized social data service 100 could be a service offered by a social networking service, where connections are stored and labeled and are visible via the social networking service. In one embodiment, the centralized social data service 100 could be configured to add new connections and/or label existing social connections on multiple third party web services (e.g. multiple social networking sites).

In one embodiment, connections are created and labeled on the centralized social data services 100 using data available from multiple services 120, 130 and 140, but no connections are created within or to such services. In one embodiment, centralized social data services 100 provides facilities to allow the users to link multiple identities to one centralized social data service 100. For example, users can link their identities on FACEBOOK, TWITTER and other social services to their profile on the centralized social data services 100. Connections can thus be derived on centralized social data services 100 using social graph of users on other services.

Figure 2:
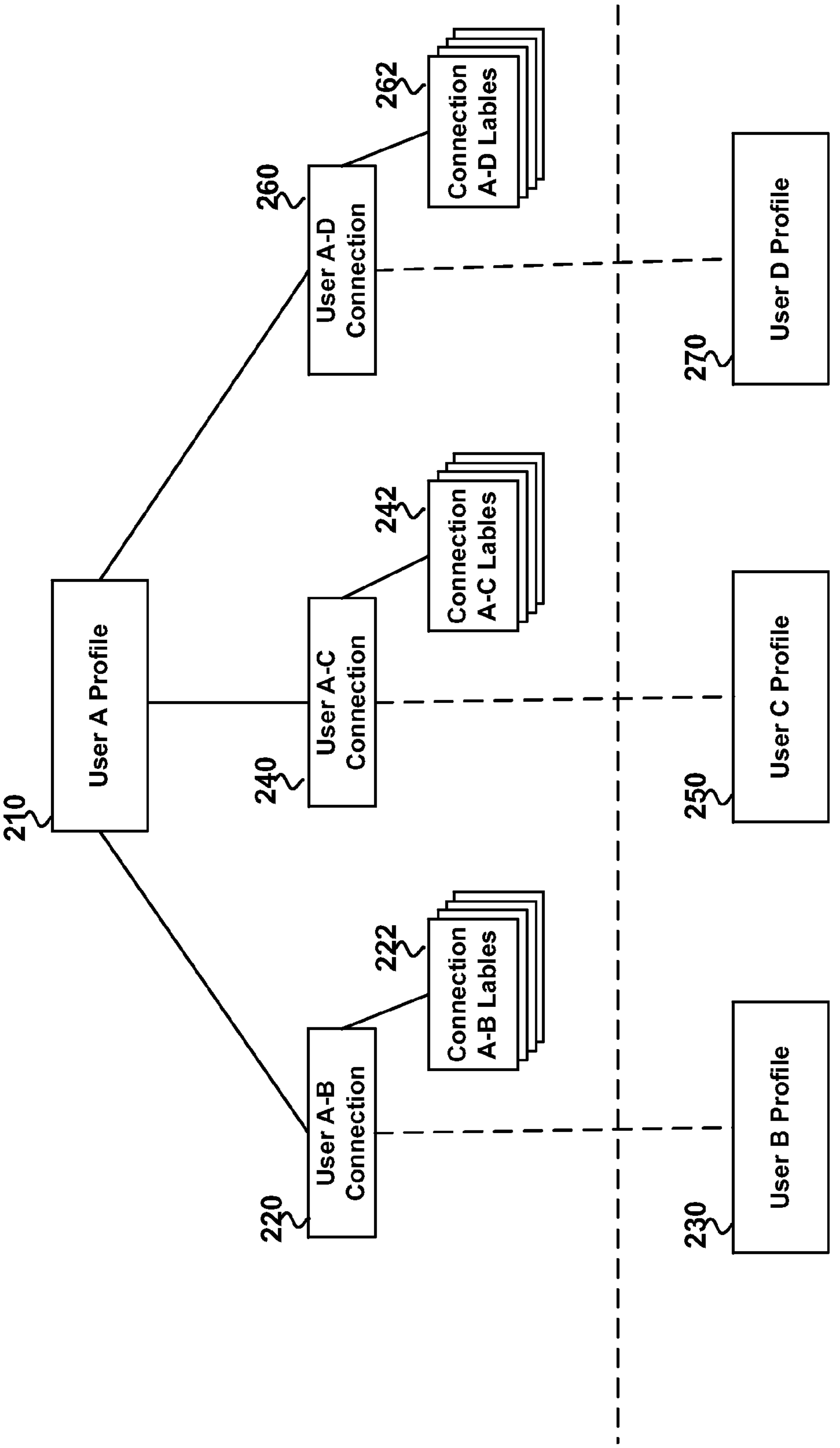
FIG. 2 illustrates one embodiment of a data model for data relating to connections and connection labels stored as user data on a centralized social data service.

FIG. 2 illustrates one embodiment of a data model for data relating to connections and connection labels stored as user data on a centralized social data service, for example, the user data 102 of the centralized social data service 100 of FIG. 1. The user data comprises a profile for user A 210. The user profile 210 can store any type of data relating to the user, including, for example, social data, interest data and demographic data. In one embodiment, the user profile stores data relating to social connections to other users.

In the illustrated embodiment, the user profile 210 stores connections 220, 240 and 260 to user profiles for three other users, user B 230, user C 250 and user D 270. Note that the user profiles user B 230, user C 250 and user D 270 could, in one embodiment, be stored within the user data of the same centralized social data service, or additionally, or alternatively, could refer or relate to user profiles on social data services remote to the centralized social data service. In the illustrated embodiment, each of the connections 220, 240 and 260 each has one or more labels, 222, 242 and 262 respectively.

Figure 3:
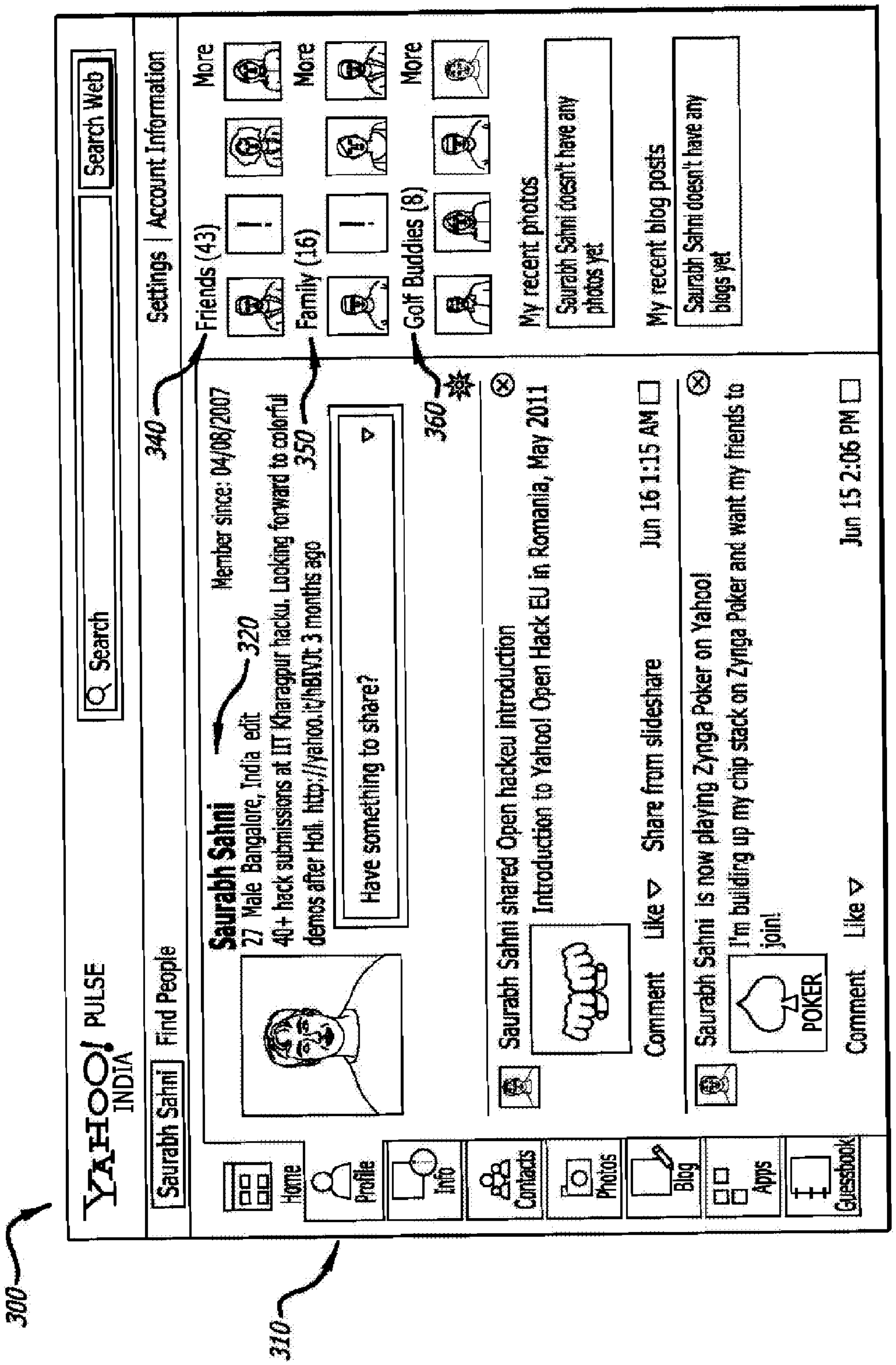
FIG. 3 illustrates one embodiment of a user interface for a social networking service showing connections with labels.

In various embodiments, connection labels, such as shown in FIG. 2, can be used for a variety of purposes. In one embodiment, connection labels can be presented in a user interface of a social networking for providing more information about a user's social connections. FIG. 3 illustrates one embodiment of a user interface 300 for a social networking service. The user profile tab 310 for a user 320 is displayed. The user profile tab 310 includes three labeled groups of the user's social connections, 340 ("Friends"), 350 ("Family") and 360 ("Golf Buddies"). In one embodiment, the group labels 340, 350 and 360 are based on labels associated with individual connections, and connections having the same label are grouped together.

Labeled connections could be used for a variety of purposes in addition to providing useful information for users of a centralized social data service. In one embodiment, such connections could be used for automated targeting, filtering and ordering social updates, content and advertisements directed to a user. In one embodiment, interesting content about a neighborhood could be directed to a user if the content originates from a connection labeled with the name of the neighborhood. For example, if five of Bob's connections who all are labeled as "San Francisco" click on same display advertisement, the same advertisement could be directed to Bob and all his connections that are also labeled as "San Francisco".

In one embodiment, such labels could allow content relating to an interest to be automatically directed to a user's connections that are most likely to be interested. For example, suppose Bob posts some photos with title "Golf Session" online John may rarely interact with Bob online, but John may be known to be his "golf buddy" from the label of their connection. The photos with title "Golf Session" could be targeted to John and other connections that are labeled as "golf buddies" of Bob. Similarly, if Bob is posting content related to his profession it can be targeted to his colleagues.

In another embodiment, such labels could allow a user to filter out social updates from an old colleague with which the user does not communicate often and is not much interested in.

In one embodiment, such connections could be used for enabling fine-grained privacy controls. Users typically do not wish to share information with everyone in their social network. Rather, they generally prefer to limit sharing with only connections relevant to the shared information, for example, limiting work related content to co-workers, limiting family related content to family, and so forth. In one embodiment, content sharing could be limited to connections with specific labels.

Figure 4:
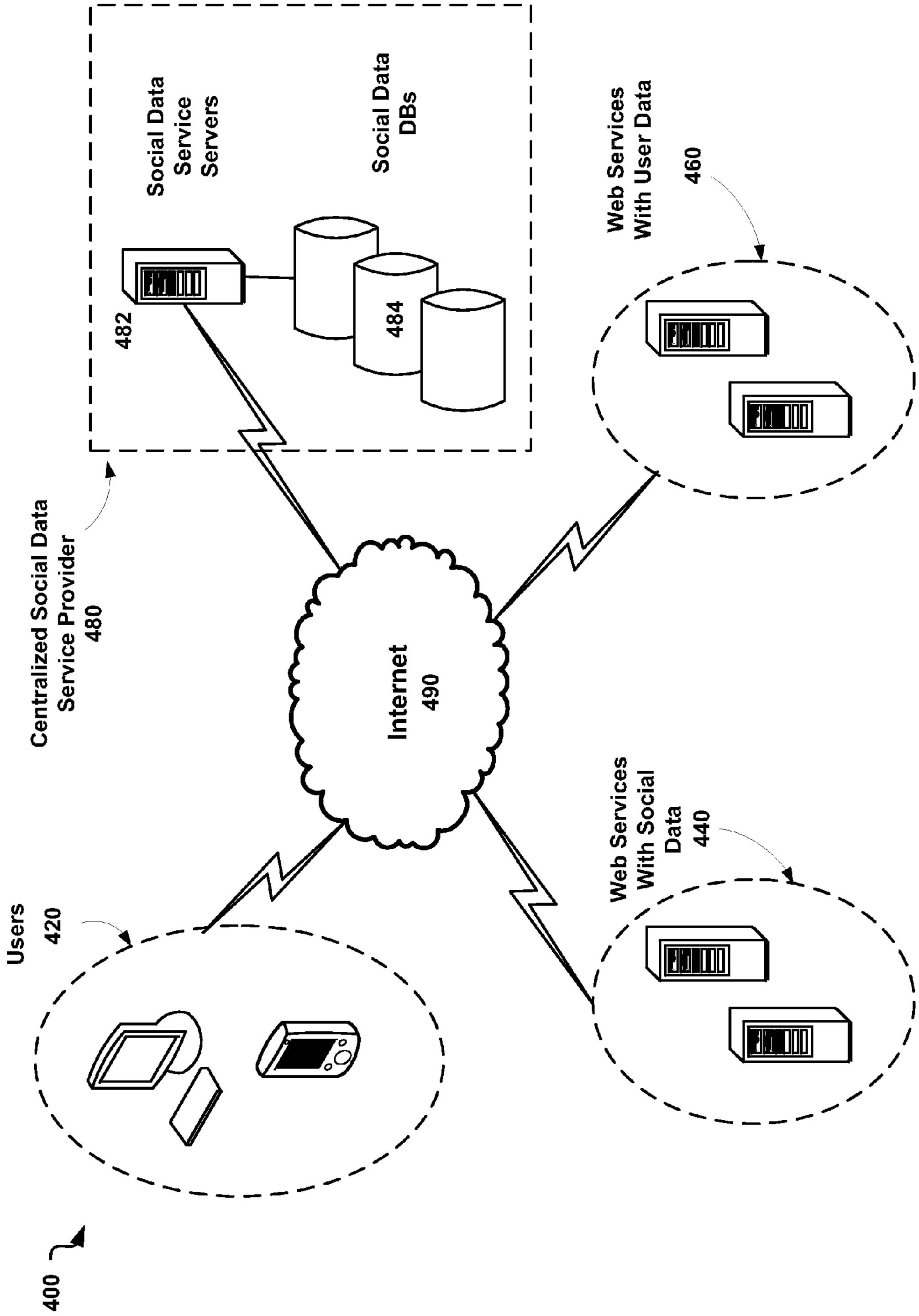
FIG. 4 illustrates a high-level view of an embodiment of a system for automated labeling of social connections based on data from multiple social networks.

FIG. 4 illustrates a high-level view of an embodiment of a system for automated labeling of social connections based on data from multiple social networks. A plurality of users 420 are members of various web services with social and user data 440 relating to such users 420. Such web services could include social networking websites, such as the TWITTER or FACEBOOK social networking websites, or more generally, any websites that allow users to interact with one another. Such social and user data could include express social network graph data, user profile information and interaction data such as messages, broadcasts and posts.

In one embodiment, data relating to some or all of the plurality of users 420 could be available via web services with user data 460. Such websites could include data that provides information about the user such as demographic information, interests, activities and hobbies. Such web services could be websites that the user controls or is a member of, such as a BLOG or personal website. Such web services could be websites that the user does not control, such as an employer's website, news websites or data aggregation services.

In one embodiment, the plurality of users 420 are members of a centralized social data service provider 480. In one embodiment, social data service servers 482 retrieve data relating to each of the plurality of servers from web services with social data 440 and web services having various other types of user data. Web services with social data 440 could include, without limitation, social networking websites, such as the TWITTER or FACEBOOK, or more generally, any websites that allow users to interact with one another. Such social data could comprise, without limitation, social network graph data, user profile information and interaction data such as messages, broadcasts and posts. Web services having various other types of user data 460 could comprise, without limitation, any type of data that be associated one or more users emails, electronic messages or other types of interaction data, BLOGs, data relating to user's employers, clubs or organizations or any other type of data reflecting user associations and/or interests.

Figure 5:
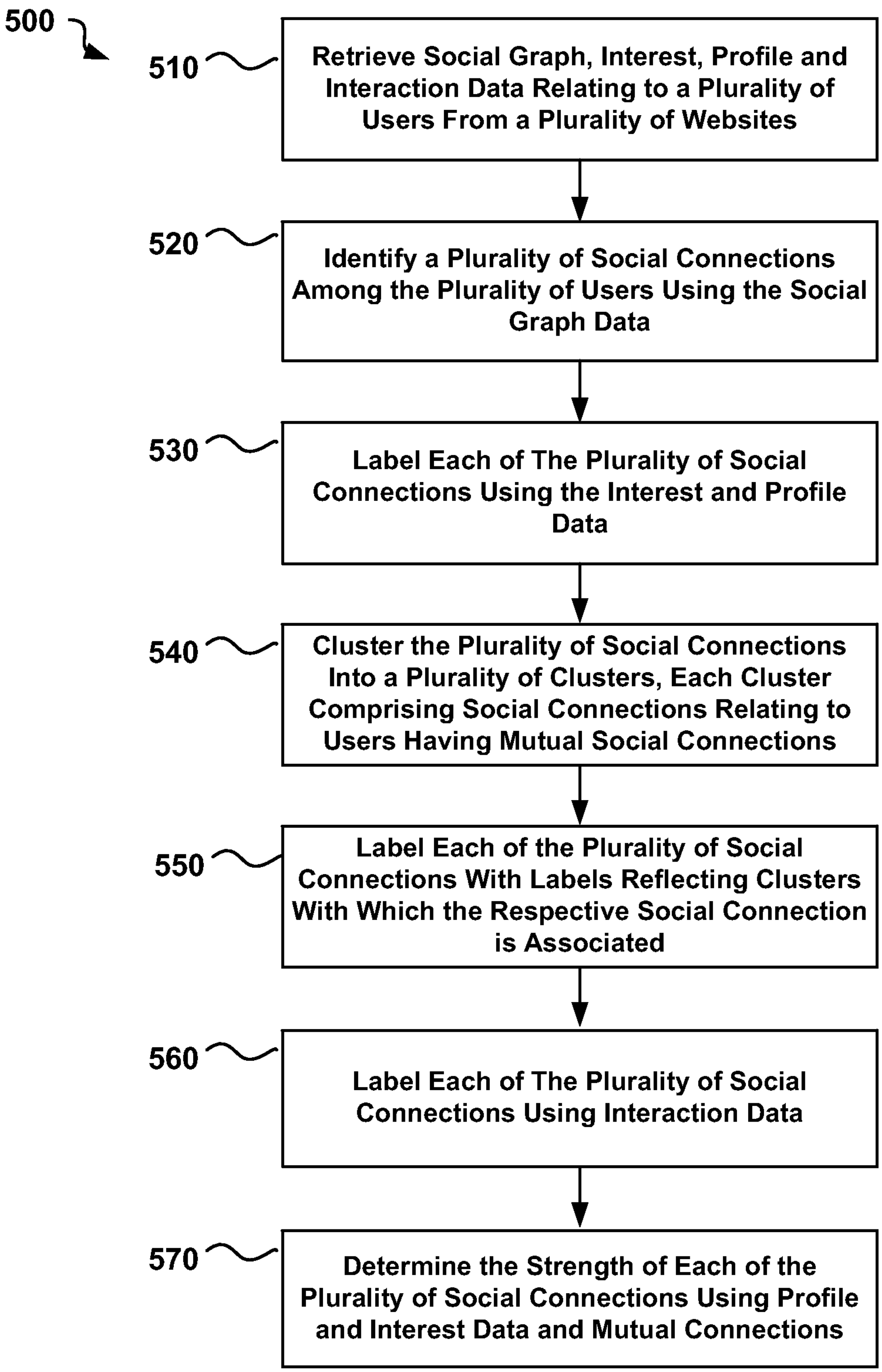
FIG. 5 illustrates an embodiment of a computer-implemented process for automated labeling of social connections based on data from multiple social networks.

FIG. 5 illustrates an embodiment of a computer-implemented process for automated labeling of social connections based on data from multiple social networks. Unless otherwise specified, it should be understood that the processing described with respect to each of the blocks of FIG. 5 is performed by at least one computing device maintained or controlled by a centralized social data service. In an embodiment, such a computing device could be one or more of the social data service servers 482 of FIG. 4.

In block 510 of the process, user data relating to a plurality of users is retrieved over a network. In one embodiment, the user data is retrieved from a plurality of websites and comprises social graph data, profile data, interest data and interaction data relating to each user of the plurality of users.

In one embodiment, social graph data could include explicit connections between two users on a socially enabled website and/or mutual connections (e.g. either "friends" or "relatives" of the same user). Interaction data could include communications of any type (e.g. email, instant messages, status messages and/or "TWEETS") between users or posted to for viewing by the general public. Interest data could include data relating to behavior (e.g. specific activities such as golfing), activities (concerts, sporting events or conferences), and/or real-time location. Profile information can include any type of information relating to or tending to describe the characteristics of a user, including demographics of any type, work address, home address, and/or employer.

In block 520 of the process, a plurality of social connections are identified by a computing device using the social graph data. In one embodiment, each social connection of the plurality of social connections reflects a connection between a respective first user of the plurality of users and a respective second user of the plurality of users. In one embodiment, social graph data reflects connections explicitly defined by the users involved in the connection, e.g. users are "friends".

In one embodiment, social graph data can additionally or alternatively reflect indirect social connections, for example, where users are connected through a chain connections between the users and one or more third persons, e.g. "friend" of a "friend", "child" of a "cousin", and so forth. In one embodiment, where the process detects an indirect social connection, the process could explicitly create a direct connection (e.g. on a social data service) between the users, which is then labeled as described below.

In one embodiment, users do not explicitly define connections with other users and the process automatically creates connections between users using user data from one or more web services. In one embodiment, connections are only created between users who are members a centralized social data service. In one such embodiment, the process creates connections between users of a centralized social data service and users of other websites by, for example, creating profiles for such users on the centralized social data service (which in some embodiments, could be later claimed by such users). In another such embodiment, the process creates connections between users of a centralized social data service and users of other websites by storing a reference to profiles for such users on such other websites (e.g. a URL).

In block 530 of the process, each social connection of the plurality of social connections is labeled by the computing device with a respective first set of labels. Each respective label of the set of labels is based on profile data and interest data for the respective first user and second associated with the respective social connection. In one embodiment, each respective label represents respective interest data or profile data for the respective first user that matches respective interest or profile data for the second user.

For example, labels could reflect topics of mutual interest, such as sports, hobbies, favorite entertainers, or political or social concerns. In one embodiment, labels could reflect common activities such as attendance at a concert, sporting event or conference. In one embodiment, labels could reflect a common geographic or social connection such as, for example, living in the same city or neighborhood, attending the same school or membership in the same club or association. Such labels could reflect a social relationship such as, for example, family, spouse, second cousin, friends and so forth.

In block 540 of the process, the plurality of social connections are clustered by the computing device into a plurality of clusters of social connections. In one embodiment, each cluster of social connections comprises a subset of the plurality of social connections, such that the respective users associated with a given cluster have mutual social connections. That is to say, within a given cluster, the users within the cluster tend to have a high instance of connections with one another and/or a specific group of other users. Such clustering could be performed using any clustering technique known in the art, such as, for example, k-means clustering.

Such clusters of mutual connections can occur, for example, among users whose social connections reflect an association with a larger group. For example, employees employed by the same department or team within a company could be clustered together using clustering analysis. While the employees profile data may reflect an association with a specific employer, such data may not reflect the employee's association with a department or team or other group of colleagues. In another example, a large group of users may tend to be in the same social circles (e.g. tend to go to specific events, bars or clubs), and have connections with a few, very popular, people.

In block 550 of the process, each social connection of the plurality of social connections is labeled by the computing device with a respective second set of labels, each respective label of the respective second set of labels being based on a respective cluster of social connections of the plurality of clusters of social connections that the respective social connection is associated with. In one embodiment, such labels are generated using collaborative filtering techniques. This can be useful in assigning labels for the cases where users have incomplete profiles. For instance if Bob and John have 35 mutual connections and the cluster they are part of have same employer if specified, all connections could be assigned a label "colleagues".

In block 560 of the process, each social connection of the plurality of social connections is labeled by the computing device with a respective third set of labels. Each of the third set of labels is based on interaction data reflecting communications between users associated with the respective social connection. For example, email or IM conversations about golf between two users could be used add labels like "golf buddies" to a connection if the interactions reveal the users tend to play golf with one another.

In block 570 of the process, each social connection of the plurality of social connections is then analyzed, by the computing device, to determine a respective strength of the respective social connection, where the respective strength of the connection is based on respective profile data, respective interest data, respective interaction data and mutual connections for the respective first user of the plurality of users and the respective second user of the plurality of users associated with the respective social connection.

In one embodiment, the strength of a social connection can be based on temporal aspects of mutual conversations, profile attributes, similar behavior, activities and mutual connections. For example, a connection could be labeled "strong" if the users recently chatted over IM or if the user commented on the connection's photo recently, or "weak" if the user's only relationship is that they attended a common event a few years back.

In one embodiment, labels could be transient and/or persistent. e.g. "attending a common event" may only be relevant for a relatively short time after an event, but the label "cricket enthusiast" could remain for relevant for a long period. Some labels, such as family related labels, could be permanent. In one embodiment, labels may be assigned an expiration period, e.g. automatically expire after one year. In one embodiment, social connections and their associated labels could be deleted when the strength of the social connection is equal to, or falls below, a threshold.

In some embodiments, one or more of the operations shown in FIG. 5 need not be performed. For example, after data relating to users is retrieved in block 510, the process may only execute the processing of blocks 520 and 530, generating labels using interest and profile data. In another embodiment, the process may only execute the process of blocks 520, 540 and 550, generating labels using clustering and collaborative filtering. In another embodiment, the process may only execute the processing of blocks 520 and 560, generating labels using interaction data. In another embodiment, the process may only execute the processing of blocks 570, determining the strength of various connections.

In various other embodiments, the processing of blocks 510 through 570 could be performed in parallel or in a sequence different than that illustrated in FIG. 5. In one embodiment, the processing shown in FIG. 5 could be executed periodically, for example, once per day. In one embodiment, the processing shown in FIG. 5 could be executed continuously and in real-time as new data relating to users becomes available.

Figure 6:
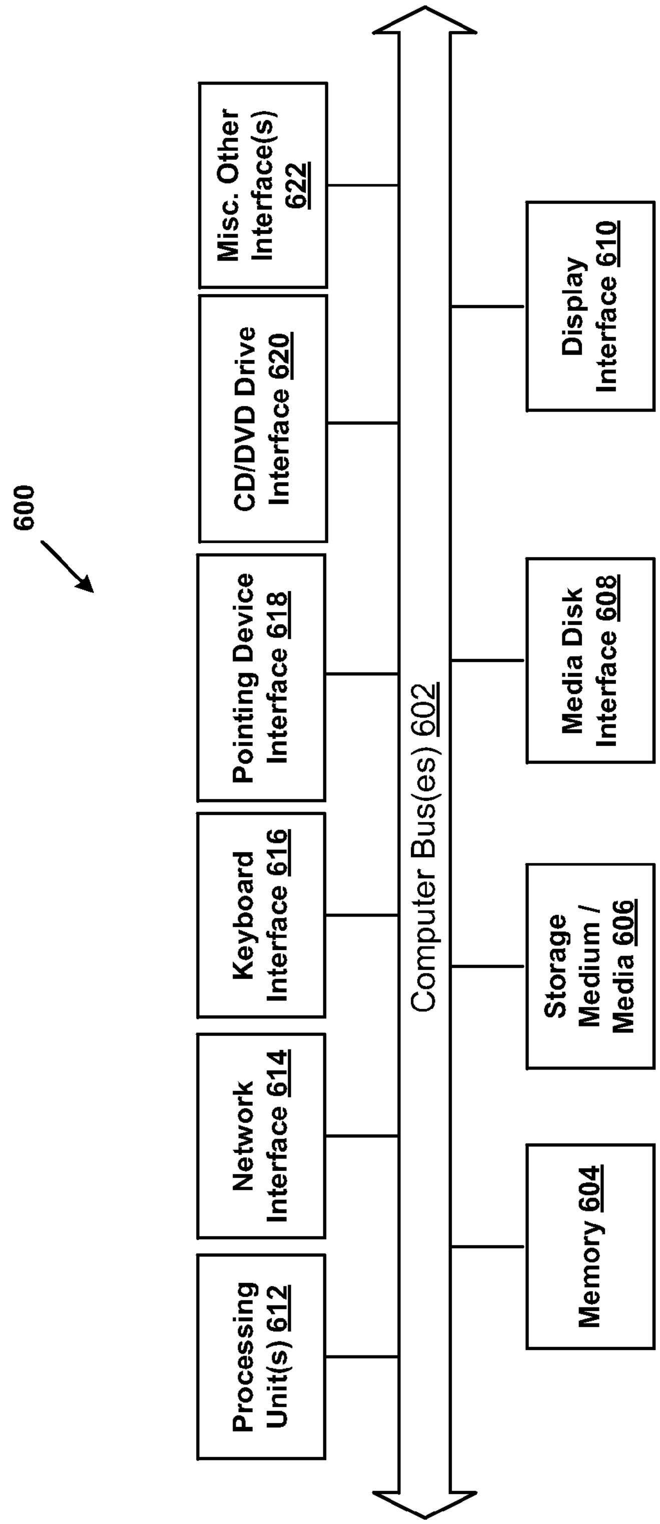
FIG. 6 is a block diagram illustrating an internal architecture of an example of a computing device.

FIG. 6 is a block diagram illustrating an internal architecture of an example of a computing device. In an embodiment, FIG. 6 could represent the internal architecture of the social data services servers 482 of FIG. 4 in accordance with one or more embodiments of the present disclosure. A computing device as referred to herein refers to any device with a processor capable of executing logic or coded instructions, and could be a server, personal computer, set top box, smart phone, pad computer or media device, to name a few such devices.

As shown in the example of FIG. 6, internal architecture 600 includes one or more processing units (also referred to herein as CPUs) 612, which interface with at least one computer bus 602. Also interfacing with computer bus 602 are persistent storage medium/media 606, network interface 614, memory 604, e.g., RAM, run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that could comprise program code that, when executed by CPU 612, perform the processing described with respect to the blocks of FIGS. 13 and 14 above. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A computing device comprising:

a processor;

a storage medium for tangibly storing thereon program logic for execution by the processor, the program logic comprising:

logic executed by the processor for retrieving, over a network, user data relating to a plurality of users, the user data being retrieved from a plurality of websites, the user data comprising social graph data, profile data, interest data and interaction data for each user of the plurality of users in association with each of the plurality of websites;

logic executed by the processor for identifying a plurality of social connections using the social graph data, each social connection of the plurality of social connections reflecting a connection between a respective first user of the plurality of users and a respective second user of the plurality of users;

logic executed by the processor for labeling each social connection of the plurality of social connections with a respective first set of labels, each respective label of the respective first set of labels being based on respective profile data and respective interest data for the respective first user of the plurality of users and the respective second user of the plurality of users associated with the respective social connection, such that the respective label represents respective interest data or profile data for the respective first user that matches respective interest or profile data for the respective second user;

logic executed by the processor for clustering the plurality of social connections into a plurality of clusters of social connections, where each cluster of social connections comprises a respective subset of the plurality of social connections having mutual connections;

logic executed by the processor for labeling each social connection of the plurality of social connections with a respective second set of labels, each respective label of the respective second set of labels being based on a respective cluster of social connections of the plurality of clusters of social connections that the respective social connection is associated with;

logic executed by the processor for labeling each social connection of the plurality of social connections with a respective third set of labels, each respective label of the respective third set of labels being based on respective interaction data reflecting communications between the respective first user of the plurality of users and the respective second user of the plurality of users associated with the respective social connection; and logic executed by the processor for analyzing each social connection of the plurality of social connections to determine a respective strength of the respective social connection, where the respective strength of the connection is based on respective profile data, respective interest data, respective interaction data and mutual connections for the respective first user of the plurality of users and the respective second user of the plurality of users associated with the respective social connection.

2. The computing device of claim 1 wherein each respective second set of labels are based on collaborative filtering of the respective cluster of social connections of the plurality of clusters with which the respective second set of labels is associated.

3. The computing device of claim 1 wherein the respective strength of the respective social connection is based on temporal aspects of the respective profile data, the respective interest data, the respective interaction data and the mutual connections for the respective first user of the plurality of users and the respective second user of the plurality of users associated with the respective social connection.

4. The computing device of claim 1 wherein at least some of the labels on the plurality of social connections expire after a predetermined period.

5. The computing device of claim 1 wherein a respective label on a respective social connection of the plurality of social connections expires when the respective strength of the respective social connection falls below a threshold.

6. The computing device of claim 1 wherein a respective social connection of the plurality of social connections expires when the respective strength of the respective social connection falls below a threshold.

7. The computing device of claim 1 wherein the social graph data comprises explicit connections between at least some users of the plurality of users.

8. The computing device of claim 1 wherein the social graph data comprises mutual connections between at least some users of the plurality of users.

9. The computing device of claim 1 wherein the interest data comprises behavior, activities, interests and real-time location data for at least some users of the plurality of users.

10. The computing device of claim 1 wherein the profile data comprises demographics, work address, home address, employer data for at least some users of the plurality of users.

11. The computing device of claim 1 wherein at least some of the plurality of social connections reflect direct connections between at least some of the plurality of users and wherein at least some of the plurality of social connections reflect indirect connections between at least some of the plurality of users.

12. A non-transitory computer-readable storage medium tangibly storing thereon computer-readable instructions, that when executed by a processor, perform a method comprising:

retrieving, over a network, user data relating to a plurality of users, the user data being retrieved from a plurality of websites, the user data comprising social graph data, profile data, interest data and interaction data for each user of the plurality of users in association with each of the plurality of websites;

identifying a plurality of social connections using the social graph data, each social connection of the plurality of social connections reflecting a connection between a respective first user of the plurality of users and a respective second user of the plurality of users;

labeling each social connection of the plurality of social connections with a respective first set of labels, each respective label of the respective first set of labels being based on respective profile data and respective interest data for the respective first user of the plurality of users and the respective second user of the plurality of users associated with the respective social connection, such that the respective label represents respective interest data or profile data for the respective first user that matches respective interest or profile data for the respective second user;

clustering the plurality of social connections into a plurality of clusters of social connections, where each cluster of social connections comprises a respective subset of the plurality of social connections having mutual connections;

labeling each social connection of the plurality of social connections with a respective second set of labels, each respective label of the respective second set of labels being based on a respective cluster of social connections of the plurality of clusters of social connections that the respective social connection is associated with;

labeling each social connection of the plurality of social connections with a respective third set of labels, each respective label of the respective third set of labels being based on respective interaction data reflecting communications between the respective first user of the plurality of users and the respective second user of the plurality of users associated with the respective social connection; and analyzing each social connection of the plurality of social connections to determine a respective strength of the respective social connection, where the respective strength of the connection is based on respective profile data, respective interest data, respective interaction data and mutual connections for the respective first user of the plurality of users and the respective second user of the plurality of users associated with the respective social connection.

13. The non-transitory computer-readable storage medium of claim 12 wherein each respective second set of labels are based on collaborative filtering of the respective cluster of social connections of the plurality of clusters with which the respective second set of labels is associated.

14. The non-transitory computer-readable storage medium of claim 12 wherein the respective strength of the respective social connection is based on temporal aspects of the respective profile data, the respective interest data, the respective interaction data and the mutual connections for the respective first user of the plurality of users and the respective second user of the plurality of users associated with the respective social connection.

15. The non-transitory computer-readable storage medium of claim 12 wherein a respective label on a respective social connection of the plurality of social connections expires when the respective strength of the respective social connection falls below a threshold, and wherein a respective social connection of the plurality of social connections expires when the respective strength of the respective social connection falls below a threshold.

16. The non-transitory computer-readable storage medium of claim 12 wherein the social graph data comprises explicit connections between at least some users of the plurality of users.

17. The non-transitory computer-readable storage medium of claim 12 wherein the social graph data comprises mutual connections between at least some users of the plurality of users.

18. The non-transitory computer-readable storage medium of claim 12 wherein the interest data comprises behavior, activities, interests and real-time location data for at least some users of the plurality of users.

19. The non-transitory computer-readable storage medium of claim 12 wherein the profile data comprises demographics, work address, home address, employer data for at least some users of the plurality of users.

20. The non-transitory computer-readable storage medium of claim 12 wherein at least some of the plurality of social connections reflect direct connections between at least some of the plurality of users and wherein at least some of the plurality of social connections reflect indirect connections between at least some of the plurality of users.

* * * * *